United States Patent
Ban et al.

(10) Patent No.: US 7,885,181 B2
(45) Date of Patent: Feb. 8, 2011

(54) RING NODE APPARATUS

(75) Inventors: Toshihiro Ban, Kawasaki (JP); Takashi Fukagawa, Kawasaki (JP); Kazuhiro Minamimoto, Kawasaki (JP); Masanori Kondo, Kawasaki (JP); Yasushi Nishine, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 12/003,284

(22) Filed: Dec. 21, 2007

(65) Prior Publication Data

US 2008/0159300 A1    Jul. 3, 2008

(30) Foreign Application Priority Data

Dec. 27, 2006   (JP) .............................. 2006-352416

(51) Int. Cl.
*H04L 12/56* (2006.01)
(52) U.S. Cl. ................. 370/219; 370/221; 370/225; 709/239
(58) Field of Classification Search ........... 370/216, 370/219, 222, 223, 229, 395.51, 403; 398/9,48
See application file for complete search history.

(56) References Cited

U.S. PATENT DOCUMENTS

| 7,345,991 B1 * | 3/2008 | Shabtay et al. .............. 370/221 |
| 2006/0007854 A1 * | 1/2006 | Yu .............................. 370/229 |

FOREIGN PATENT DOCUMENTS

JP    11-041282    2/1999

* cited by examiner

*Primary Examiner*—Seema S Rao
*Assistant Examiner*—Wanda Z Russell
(74) *Attorney, Agent, or Firm*—Staas & Halsey LLP

(57) ABSTRACT

According to an aspect of an embodiment, a node apparatus used in at least part of nodes in a network formed by a plurality of nodes coupled in the shape of a ring, comprising: a working node function performing unit for performing functions as a working apparatus that selectively drops a frame destined for a terminal hosted by the node itself among frames transmitted on the ring and adds a frame from the terminal hosted by the node itself to frames transmitted on the ring; a back-up function performing unit for performing functions as a back-up apparatus that lets a frame destined for a terminal hosted by the node itself pass through to an adjacent node and discards a frame from the terminal hosted by the node itself; and a function selection unit for selectively enabling one of the working node function performing unit and the back-up function performing unit.

12 Claims, 13 Drawing Sheets

RING NODE APPARATUS

TECHNICAL FIELD

The present invention relates to an apparatus for forming a communication network, particularly an RPR (Resilient Packet Ring) ring network.

RPR is a Layer 2 protocol for providing carrier-grade ring protection functions in a packet ring and is standardized in IEEE802.17 (hereinafter, IEEE802.17 is simply referred to as a standard).

SUMMARY

According to an aspect of an embodiment, a node apparatus used in at least part of the nodes in a network formed by a plurality of nodes coupled in the shape of a ring, comprising: a working node function performing unit for performing functions as a working apparatus that selectively drops a frame destined for a terminal hosted by the node itself among frames transmitted on the ring and adds a frame from the terminal hosted by the node itself to frames transmitted on the ring; a back-up function performing unit for performing functions as a back-up apparatus that lets a frame destined for a terminal hosted by the node itself pass through to an adjacent node and discards a frame from the terminal hosted by the node itself; and a function selection unit for selectively enabling one of the working node function performing unit and the back-up function performing unit, wherein in use in the network, both a working apparatus in which the working node function performing unit is selected and a back-up apparatus in which the back-up function performing unit is selected are incorporated in the ring to constitute part of the ring, and the hosted apparatus coupled to the working apparatus is also coupled to the back-up apparatus, and the working apparatus and the back-up apparatus are assigned the same identifier as an identifier by which each node apparatus included in the ring identifies the other.

DESCRIPTION OF THE PREFERRED EMBODIMENTS

Figure 1:
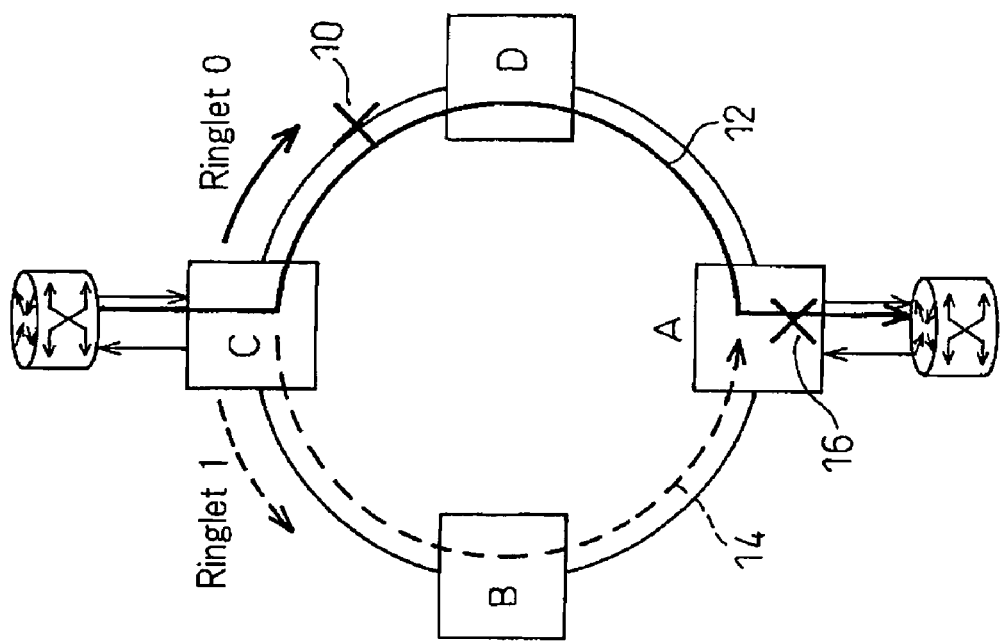
FIG. 1 shows an overview of an RPR ring network.

FIG. 1 shows an exemplary RPR ring network. An RPR network has the following redundancy functions (standard).

(1) For a disconnection of a transmission path on the RPR ring (e.g., a point indicated by a symbol "x" 10 in FIG. 1), ring redundancy switching (steering/wrapping mode) is activated to bypass the failed transmission path, thereby avoiding discontinuance of communications. FIG. 1 illustrates switching by steering, which protects a path 12 in the clockwise Ringlet 0 direction with a path 14 in the counterclockwise Ringlet 1 direction.

(2) For a failure in a transmission apparatus included in the ring, or a failure in a line associated with a working transmission apparatus (e.g., a failure in a node A indicated by a symbol "x" 16 in FIG. 1), the ring redundancy switching, as in the case of the ring transmission path failure, is used to bypass the node A and maintain communications between terminals belonging to nodes other than the node A.

Thus, it is an object of one aspect of an embodiment to provide, in an RPR ring network, a node redundancy technique capable of rescuing a communication with a terminal belonging to a working node in the event of a failure in the working node and a failure in a line associated with the working node.

Preferably, such a node redundancy technique can be implemented with a general-purpose L2/L3 switch without requiring special functions other than standard functions in other nodes in the RPR ring network that are not redundantly configured, and without requiring special interfaces or protocols in a device connected to redundant nodes.

By using the node apparatus with the above configuration in the above aspect, a communication with a hosted terminal can be protected in the event of a failure in a line associated with a redundant node. Also in the event of a failure in the transmission apparatus included in the ring, the above-described ring redundancy switching is activated to bypass the failed transmission apparatus, so that communication with the hosted terminal can be protected.

In addition, no special functions other than standard functions are required in other nodes, and no special interfaces or protocols are required in a device connected to the redundant nodes.

Figure 2:
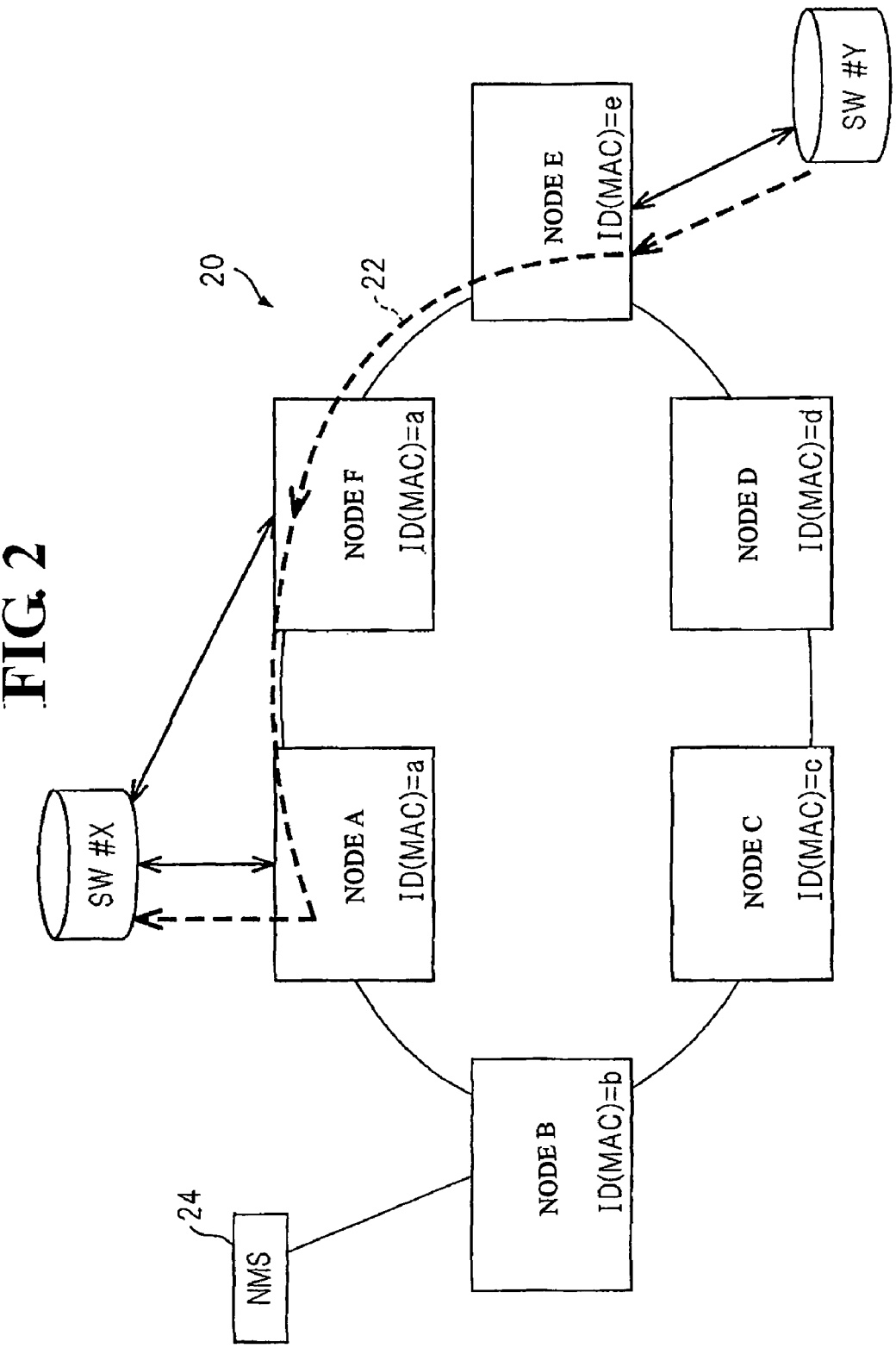
FIG. 2 shows the configuration and general operations of a node redundancy technique of the embodiment.

General operations of a node redundancy technique will be described according to an example in FIG. 2. FIG. 2 shows the case where nodes A and F implement node redundancy on an RPR ring network such that dual paths to an SW #X are connected to these nodes. Nodes A to E constituting the RPR ring network are assigned MAC addresses a to e as IDs (identifiers) for identifying each other, respectively. The node F is assigned a MAC address a, which is the same as one for the node A.

Therefore, the node A and the node F are recognized by the nodes B to E as one node. The redundant nodes A and F are differentiated as a working node and a back-up node. In FIG. 2, the node A is the working node and the node F is the back-up node. For example, a communication between a terminal hosted by the nodes A and F and a terminal hosted by the node E via the SW #X and an SW #Y is passed through the node F while being carried out along a path 22 indicated by a dashed line in FIG. 2.

In FIG. 2, a network management system (hereinafter referred to as an NMS) 24 is connected to the node B. An operator uses this NMS 24 to make settings for each node and monitor the state of each node. Here, the node apparatuses A to F are identified by the apparatus numbers A to F assigned for management rather than by the MAC addresses a to e.

Figure 3:
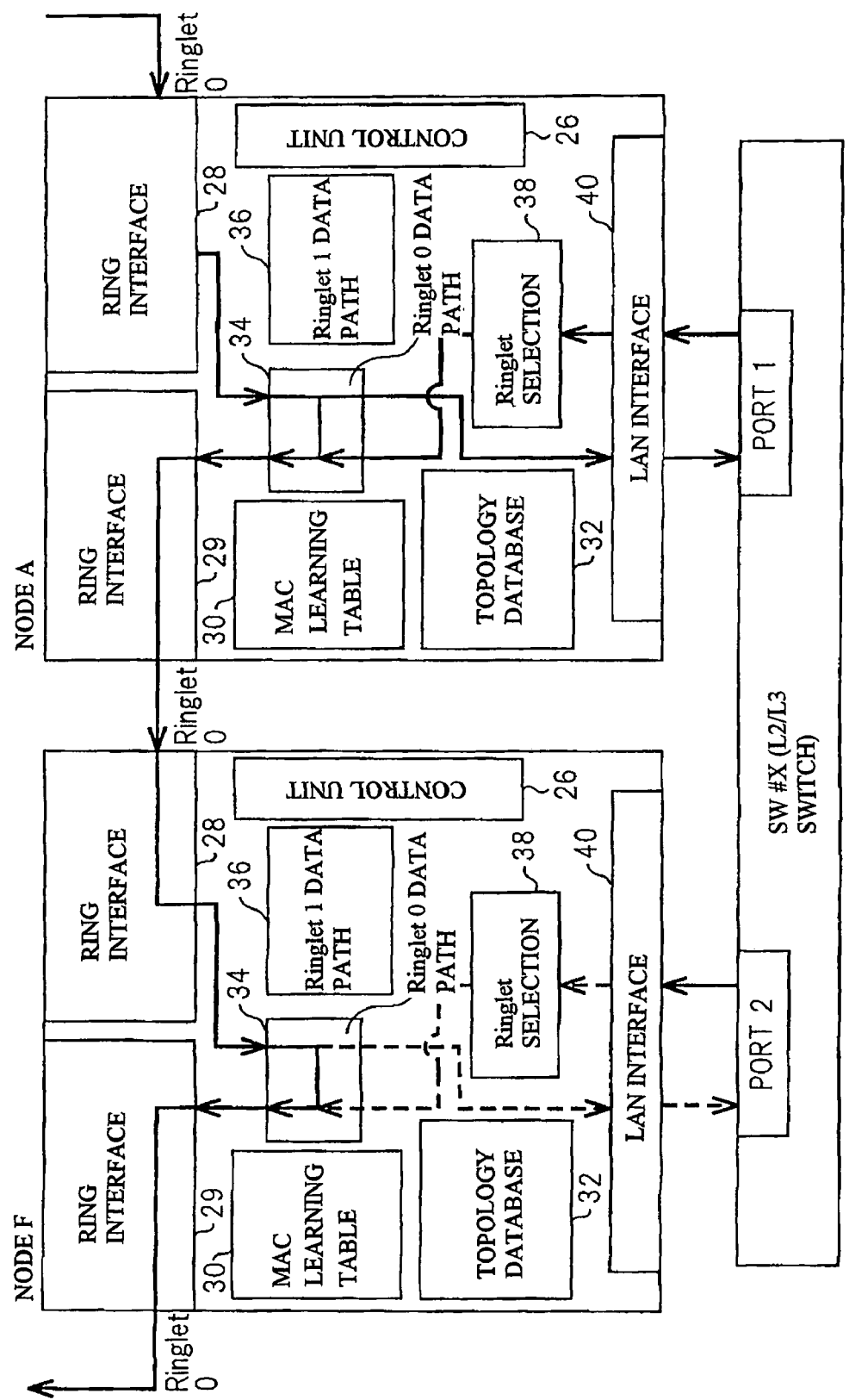
FIG. 3 is a block diagram of redundancy configuration in the embodiment.

FIG. 3 shows a block diagram of the redundantly configured nodes, in which only the node A, the node F, and the SW #X in FIG. 2 are extracted to show their relationship. Although FIG. 3 indicates only the Ringlet 0 direction, the same control also applies to the Ringlet 1 direction. General operations of each component will be described below. The node redundancy technique in the RPR ring according to the embodiment is implemented in a control unit 26 in FIG. 3.

In FIG. 3, ring interfaces 28 and 29 are interface units for connection with the RPR ring network.

MAC learning tables 30 are where learned information (to be described later) on SAs (source addresses) of received frames are registered. Topology databases 32 have registered therein ring information (such as the number of stations and failure information), information about its own station (such as a local MAC address and a switching mode), and information about the other stations. Each node included in the ring constructs the database based on topology information in control frames collected from the other stations. Ringlet 0 data paths 34 and Ringlet 1 data paths 36 perform frame transmission and reception, frame transit and strip, and frame copy for the Ringlet 0 and the Ringlet 1 respectively.

Ringlet selection units 38 perform frame format selection, flooding selection, ringlet selection, and so on. Control units 26 are components that control the inside of the corresponding node and hold an indication whether the node is the back-up node or the working node. LAN interface units 40 are interface units for connection with a line associated with the corresponding node.

The node A shown on the right side in FIG. 3 is set in the working state by default as will be described later, and performs standard operations as a node apparatus. That is, the Ringlet 0 data path 34 drops those among frames or packets (hereinafter collectively referred to as frames) from the ring interface 28 that are destined for a terminal belonging to the node, and lets other frames pass through to an adjacent node via the ring interface 29. The Ringlet 1 data path 36 also operates in a similar manner. The dropped frames are output to a port 1 of the SW #X via the LAN interface 40. Frames from the SW #X are added to frames from an adjacent node in the Ringlet 0 data path 34 or the Ringlet 1 data path 36 via the LAN interface 40 and the Ringlet selection unit 38.

The node F shown on the left side in FIG. 3 is set in the back-up state by default as will be described later. Under the control of the control unit 26, the Ringlet 0 data path 34 in the node F lets all frames from an adjacent node pass through to the other adjacent node without dropping or adding frames, as indicated by dashed lines in FIG. 3. The Ringlet 1 data path 36 also operates in the same manner. While frames from the terminal hosted by the node are output not only from the port 1 but also from a port 2 of the SW #X, the LAN interface 40 blocks transfer of the frames beyond the node itself. The frames are not dropped as well, as mentioned above. Therefore, the back-up node apparatus and the SW #X are linked together but have no flow of frames between them.

Figure 4:
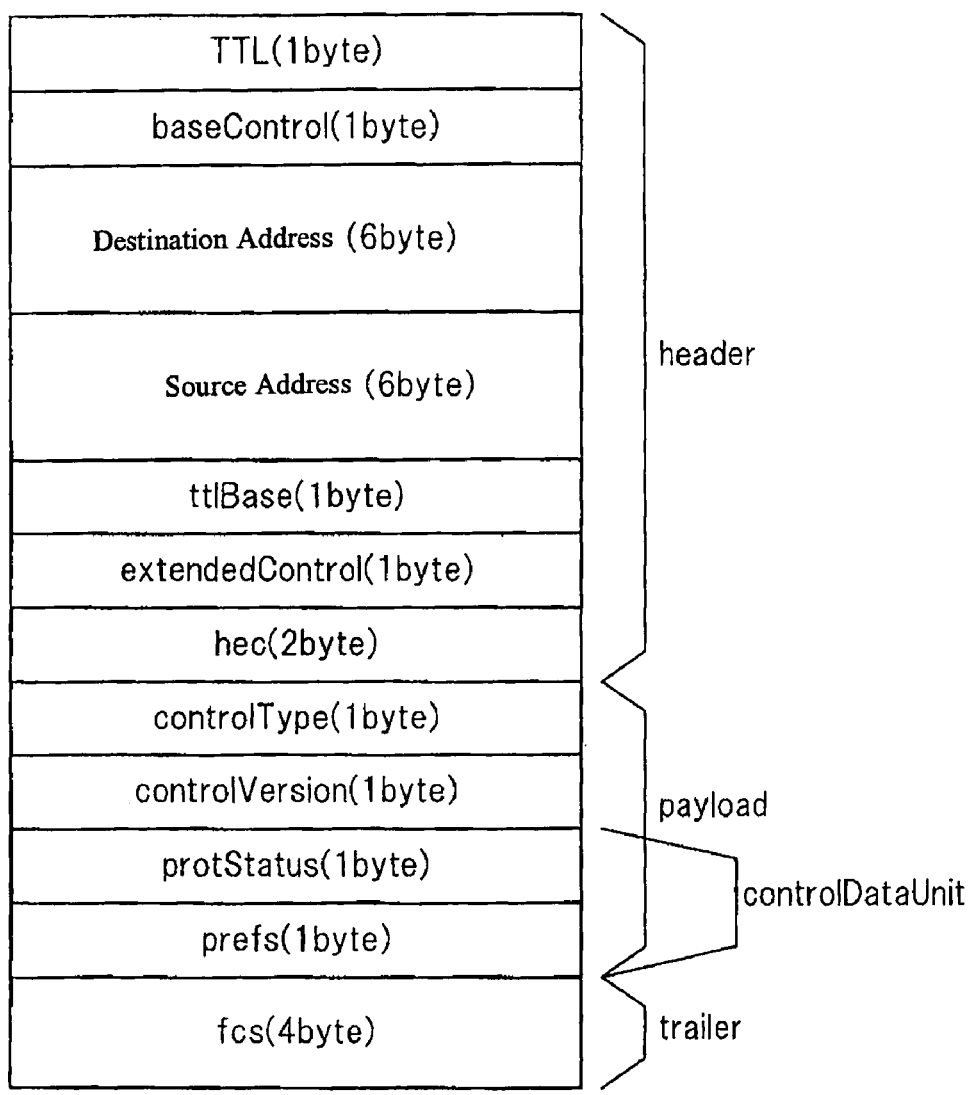
FIG. 4 shows a TP frame format for a control frame.

Working/back-up switching in the event of a failure in the working node apparatus is performed by, for example, monitoring a TP (Topology and Protection) frame from the working apparatus at the back-up apparatus. FIG. 4 shows the frame format of the TP frame. The TP frame, which is one of control frames required for each station to construct the topology database, informs all stations of topology information, failure information, switching information, and so on by periodic broadcasting. Since this frame format is a standard format, its fields will not be described in detail. The back-up node determines that one of received TP frames that has a source address (hereinafter referred to as an SA) the same as the ID of the node itself is from the working node. Based on the stoppage of this TP frame, the back-up node determines an abnormal condition of the working node and performs a switching operation.

The working node, in the event of an abnormal condition of a line associated with the working node, informs the back-up node of the abnormal condition by stopping transmission of the TP frame that the working node is periodically transmitting. Alternatively, a command from the NMS 24 (FIG. 2) may stop the TP frame transmission to cause the working/back-up switching. Of course, the TP frame transmission stops in the event of a failure in the node itself.

Whether a node operates as the back-up node or the working node in the initial state when the node starts or recovers from a failure is set by the NMS 24 (FIG. 2). Alternatively, when a node starts or recovers from a failure, the node may start in a pass-through state and remain in this state for a predetermined period. Then, the node may continue operating as the back-up node if a control frame having the same station ID (MAC address) as the node itself is received from the working node in that period, or may switch to operation as the working node if such a control frame is not received.

Since the back-up apparatus only lets frames pass through and does not let frames transit to and from the hosted terminal, the result of address learning in the RPR ring network, i.e., the result of learning of addresses of terminals existing under the other nodes is not accumulated in the MAC learning table 30 (FIG. 3). Therefore, just after the back-up apparatus is switched to the working apparatus, the apparatus would need to broadcast frames for which the destination has not been learned. To address this problem, the working apparatus can inform the back-up apparatus of the learning result each time the working apparatus obtains the learning result so that the MAC learning table 30 in the back-up apparatus is synchronized with the MAC learning table 30 in the working apparatus. For example, informing of the learning result is possible by using an RPR control frame with a unique identifier added to its Reserve-area or the like. When the back-up apparatus receives this frame, the back-up-apparatus records the provided learning result in the MAC learning table 30 and discards this frame without letting it pass through.

Table 1 shows initial setting items that are set by the NMS in a node apparatus according to an embodiment. These setting items are set for the control unit 26 (FIG. 3) in the node apparatus and stored in, for example, nonvolatile memory (not shown) in the control unit 26.

TABLE 1

| | Setting Item | Setting for Node A | Setting for Node F | Setting for Nodes B to E | Note |
|---|---|---|---|---|---|
| Setting (1) | Redundancy Function Enable/Disable | Enable | Enable | Disable | Setting Unique to the Embodiment |

TABLE 1-continued

| Setting Item | | Setting for Node A | Setting for Node F | Setting for Nodes B to E | Note |
|---|---|---|---|---|---|
| Setting (2) | Default Working/Back-up | Working | Stand-by | No Setting Required | Setting Unique to the Embodiment |
| Setting (3) | TP Frame Reception Stop Determination Period (Node Switching Protection Period) | 15 ms | 15 ms | No Setting Required | Setting Unique to the Embodiment |
| Setting (4) | Station ID (MAC Address) | a | a | b to e Respectively | |
| Setting (5) | TP Frame Transmission/Reception Cycle | 5 ms | 5 ms | 5 ms | Cycle of Periodically Transmitted TP Frame |
| Setting (6) | TP Frame Reception Stop Determination Period (RPR Switching Protection Period) | 30 ms | 30 ms | 30 ms | |

In Table 1, the Redundancy Function Enable/Disable setting (1) is an item set for all nodes constituting the ring. This setting allows a node to determine whether the node is a redundant node. In the example of FIG. 2, the nodes B to E that are irrelevant to the redundancy configuration have this item set to "Disable", thereby operating as normal RPR nodes conforming to the standard.

The Default Working/Back-up setting (2) is an item set if the Redundancy Function Enable/Disable setting is set to "Enable". A redundantly configured node in the ring network determines whether the node is the working node or the back-up node based on this setting.

The TP Frame Reception Stop Determination Period (Node Switching Protection Period) setting (3) is an item if the Redundancy Function Enable/Disable setting is set to "Enable". The back-up node monitors the TP frame periodically transmitted from the working node in the TP Frame Transmission/Reception Cycle setting (5). If the TP frame does not arrive in this set period, the back-up node determines the stoppage of TP frame reception and therefore a failure of the working node. This period is set shorter than the TP Frame Reception Stop Determination Period (RPR Switching Protection Period) setting (6) so that the back-up node can determine a failure of the redundantly configured working node before the RPR switching (steering/wrapping mode) occurs for the failure of the working node.

The Station ID (MAC address) setting (4) is assigned in such a manner that the redundantly configured nodes are assigned the same ID. While assigning a Station ID to each node is a standard setting, where each node existing on the ring is basically assigned a different ID, it is one of the features of the embodiment to assign the same ID. The node apparatuses, constituting the ring, identify each other by these Station IDs, whereas the NMS identifies the node apparatuses by the apparatus numbers A to F.

Figure 5:
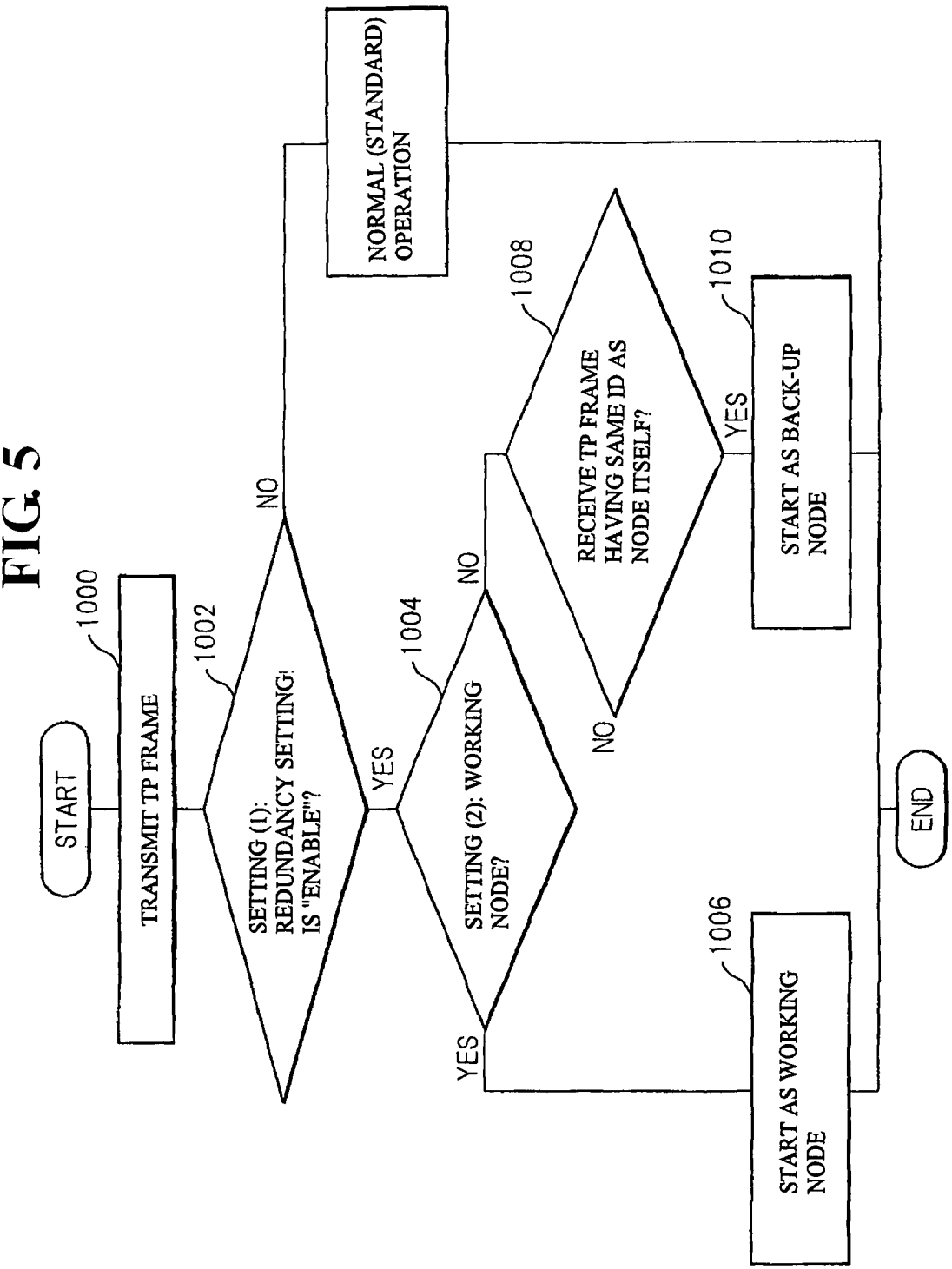
FIG. 5 is a flowchart of a first example of initial operations.

FIG. 5 shows a flowchart of the initial operation. Each node in the RPR ring network constructs its topology database by periodically broadcasting the TP frame (standard). In this topology database construction, each of the redundantly configured nodes A and F operates by determining whether it is the working node or the back-up node in the following manner.

i) In the TP frame transmission (step 1000), the nodes A and F broadcast the TP frame with the Source MAC address=a.

ii) If the setting (1)=Enable (step 1002), i.e., if the node is set as a redundant node, the item of the setting (2) is referred to (step 1004). If the setting (2)=Working, the node recognizes itself as the working node by default setting. Therefore, the node continues the TP frame transmission to construct the topology database and starts as the working node (step 1006). If the setting (2)=Back-up, the node recognizes itself as the back-up node by default setting and will receive the TP frame having the same SA as the node itself (step 1008). The node then stops its TP frame transmission and starts as the back-up node (step 1010).

To prevent the TP frame transmitted by a node from circling the ring and being received by the node itself, a measure is taken that controls this by using a TTL value in an RPR header (see the frame format in FIG. 4). The TTL (Time To Live) value is a value indicating the effective period (the number of effective hops) for the RPR frame and is expressed as an integer up to 255 at the maximum. Each time a frame goes through an RPR station, the TTL value is decremented by one and set as the TTL value for that frame. A frame with its TTL value decremented to be zero is discarded at that point, so that the frame is not output to the ringlet and does not reach the next node.

Thus, the back-up node (node F) physically exists in the ring but does not exist in the topology database of the other nodes. The back-up node is also in the state where it does not affect communications of main signals.

Table 2 below illustrates the topology database constructed in the node C in FIG. 2.

TABLE 2

| Hop | 1 | 2 | 3 | 4 |
|---|---|---|---|---|
| Ringlet 0 | | | | |
| MAC Address | b | a(*1) | e | d |
| Ringlet 1 | | | | |
| MAC Address | d | e | a(*1) | b |

(*1)Nodes A and F do not separately exist but are recognized as one node having the MAC address a.

In normal times, the back-up node outputs all frames received from the Ringlet 0 and Ringlet 1 to the same Ringlet 0 and Ringlet 1 without processing them (pass-through). Among these frames, the back-up node monitors control frames to keep track of the state of the working node.

The back-up node controls the LAN interface 40 (see FIG. 3) to stop transmission of frames downward. The back-up node also causes the LAN interface 40 to block frames transmitted from the device hosted by the node (e.g., the L2 switch device) without processing the frames. With this control, the back-up node and the device hosted by it are connected with each other via the physical link at the port 2 but have no data exchanges. Therefore, the port 2 of the hosted device is not available for the MAC learning. All communications over the RPR ring network that are output from the hosted device are output from the port 1 on the working node side.

Figure 6:
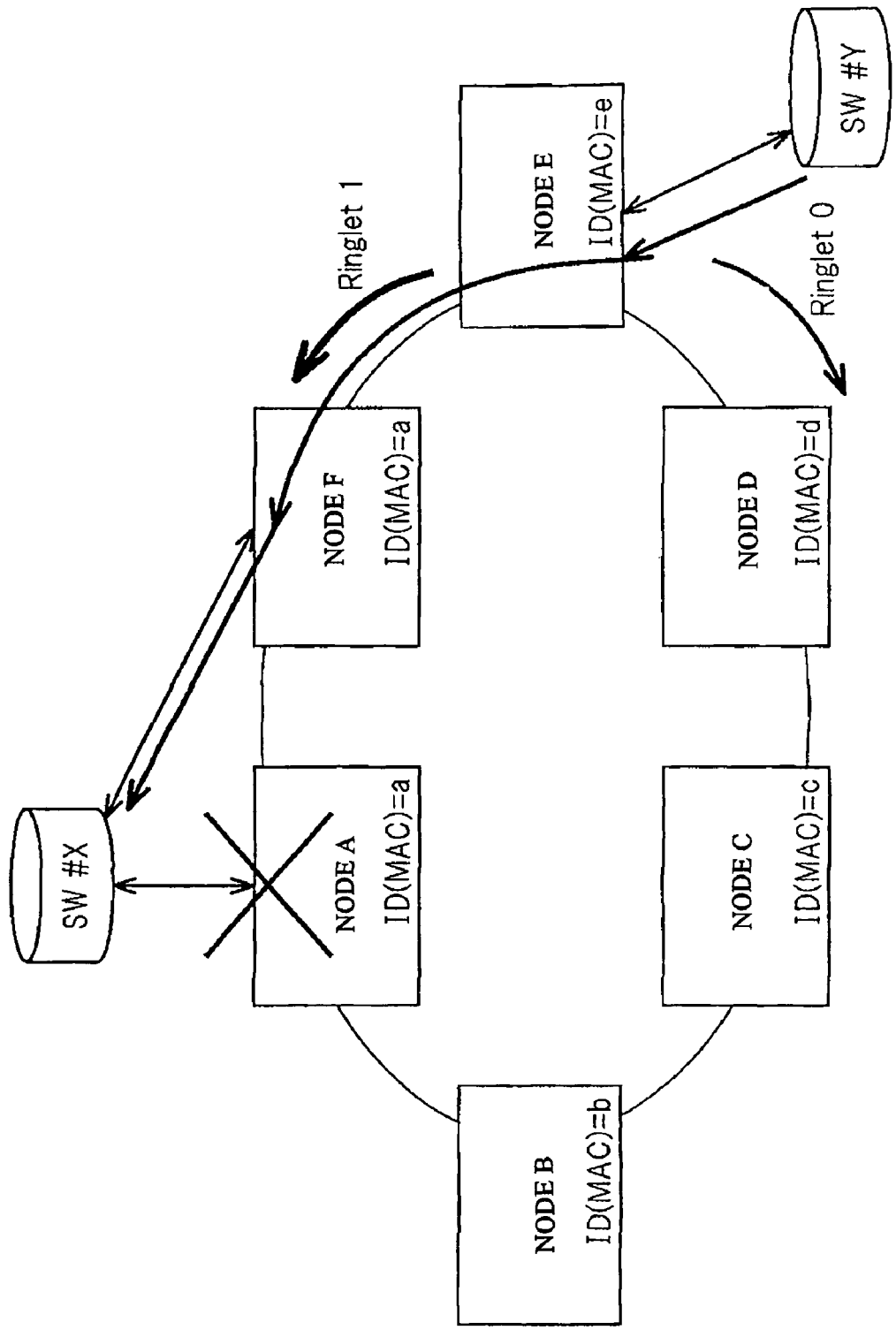
FIG. 6 shows general operations on the occurrence of a failure in a working node.
Figure 7:
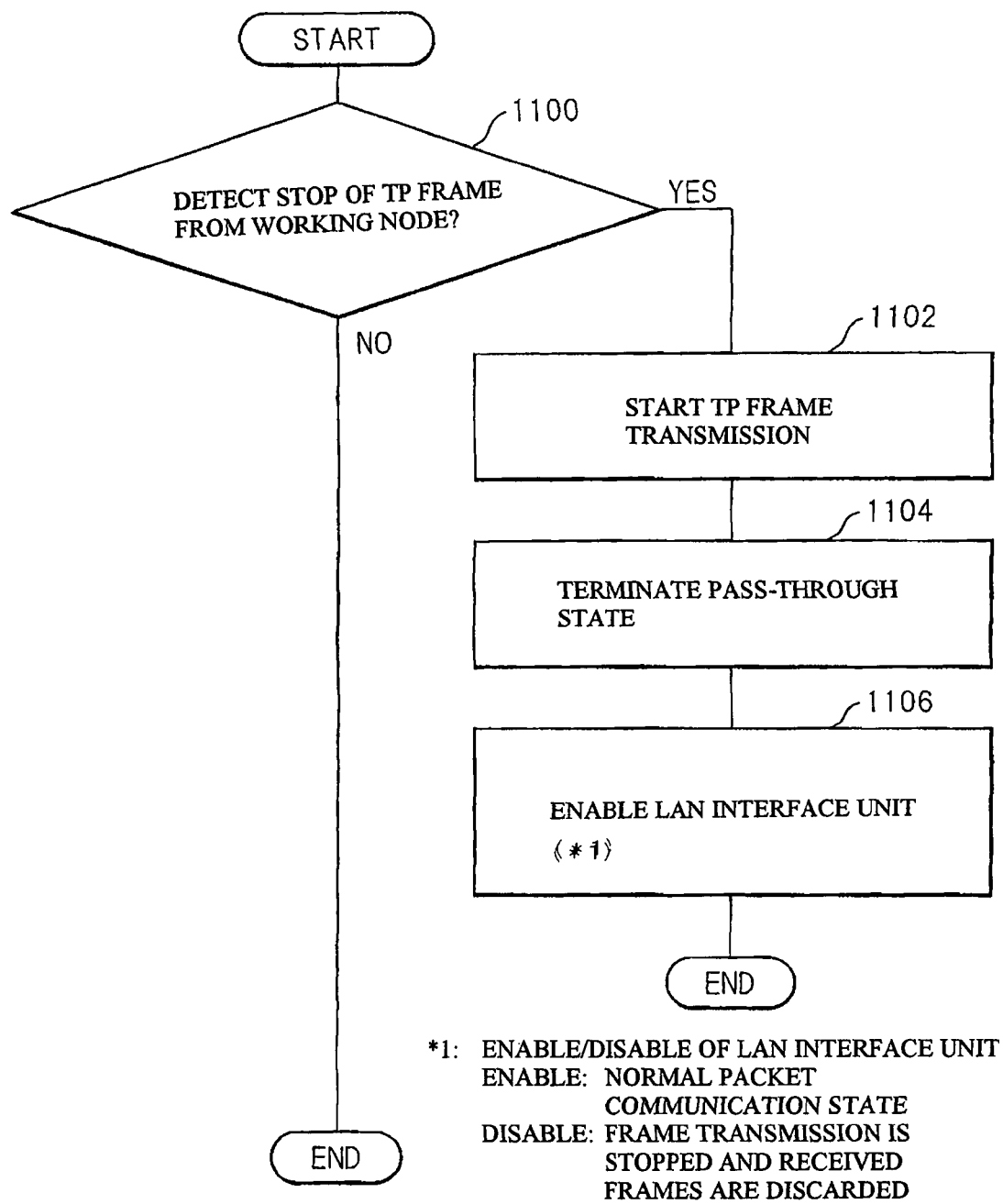
FIG. 7 shows switching operations in a back-up node.

As shown in FIG. 6, general operations for switching to the node F on the occurrence of a failure in the node A will be chronologically described. FIG. 7 shows a flowchart of the switching operations in the back-up node.

i) Once a failure occurs in the working node A, the transmission of the TP frame periodically transmitted from the node A in the Ringlet 0 direction and the Ringlet 1 direction stops.

ii) The failure state of the node A is detected based on the inability of the node F to receive the TP frame from the node A (SA=a) after a lapse of a predetermined period.

iii) Since the initial setting (3)=15 ms (Table 1), the node F determines a failure in the node A if it does not receive the TP frame having SA=a in 15 ms (step 1100 in FIG. 7).

iv) The node F, having detected the failure in the node A, starts transmitting the TP frame (SA=a) in place of the node A (step 1102).

v) The node F is freed from the pass-through state (step 1104). At the same time, the port is opened for the LAN interface unit that has been blocking communications to and from under the node (step 1106). The node F starts data transmission and reception to perform packet transfer operation conforming to the standard.

vi) Since the node F has started operating as the working node in place of the node A, the other nodes again receive the TP frame having SA=a.

Meanwhile, the nodes B to E only recognize the path switching due to the occurrence of a link failure between the nodes A and B but do not recognize the switching from the node A to the node F. Therefore, communications with the terminal hosted by the node A are continued.

Figure 8:
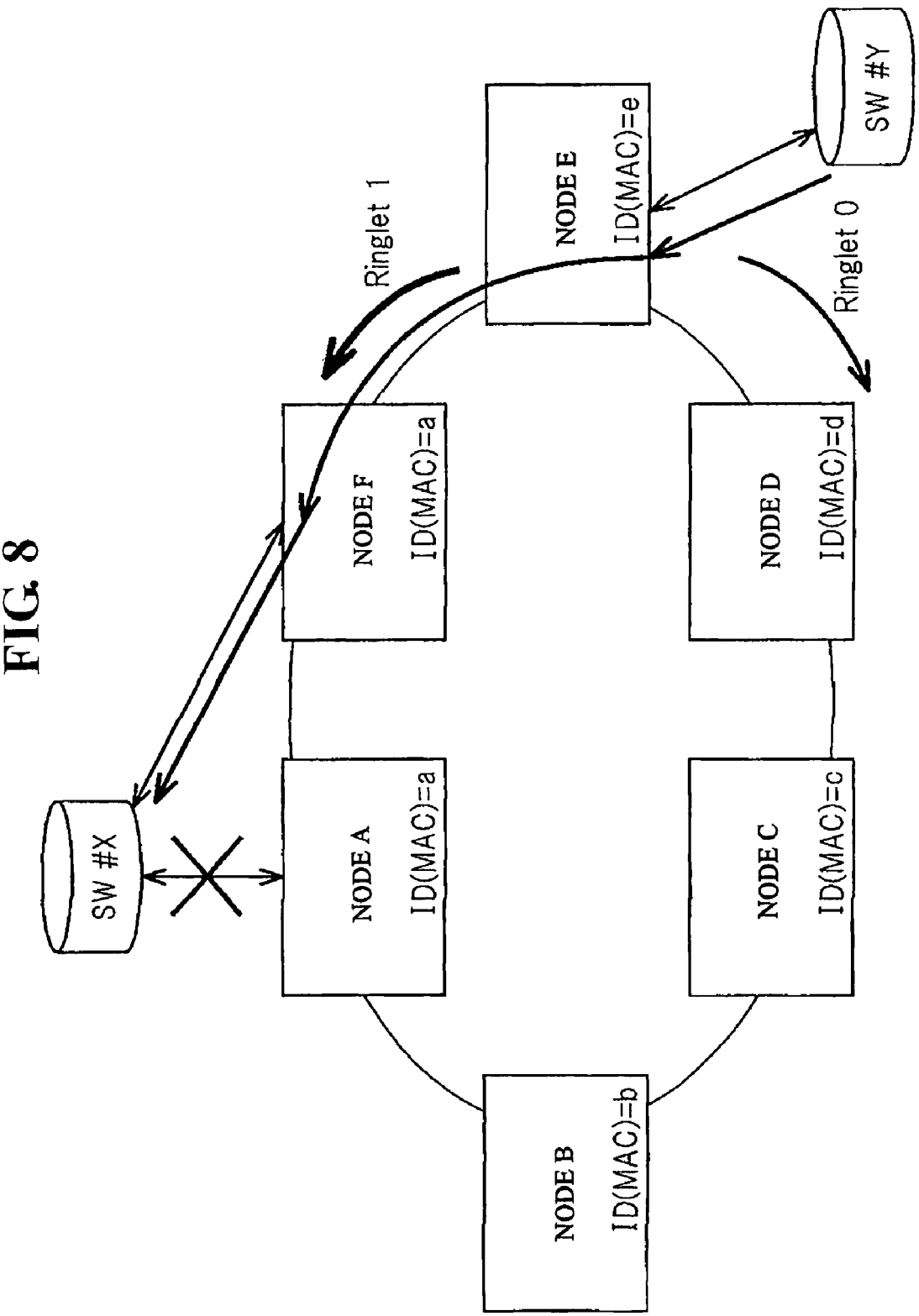
FIG. 8 shows general operations on the occurrence of a failure in a line associated with the working node.

Now, as shown in FIG. 8, general operations for switching to the node F on the occurrence of a failure in a tributary line associated with the node A will be chronologically described.

i) Once a disconnection of a tributary line associated with the node A is detected in the node A, the TP frame transmission from the node A is stopped.

ii) to v) are the same as the above-described ii) to v) for the node failure.

vi) After stopping the transmission of the TP frame (SA=a), the node A transitions to the back-up node in the pass-through state. The period of the initial setting (3) is required for the back-up node to transmit the TP frame after the working node stops the TP frame transmission. However, setting "the period of the initial setting (6)>(is greater than) the period of the initial setting (3)" as in Table 1 prevents the TP frame transmission from being stopped for the period of the initial setting (6). Therefore, the RPR ring protection is not effectuated on the occurrence of a failure in the tributary line associated with the working node.

General operations after the occurrence of a failure of the node A up to the recovery will be chronologically described.

i) The failure of the node A is recovered and the node A starts.

ii) The node A broadcasts the TP frame.

iii) The node F receives the TP frame having the same Source MAC address as the node itself.

iv) The node F stops the TP frame transmission and enters the pass-through state to stop communications to and from under the node. The node F operates as the back-up node, and the node A operates as the working node.

The above operations i) to iv) realize a mode (switchback mode) in which the working node operates whenever it is in a normal condition on the ring and the back-up node operates only on the occurrence of a failure. According to the node redundancy technique of the embodiment, quick node redundancy switching is possible. It is also possible to implement the redundancy configuration wherever the redundancy configuration exists on the ring (even if the working apparatus and the back-up apparatus are not adjacent to each other) or even if one node has two or more RPR stations, each being redundantly configured.

Table 3 shows initial setting items that are set by the NMS in a node apparatus according to another embodiment. What are different from Table 1 are that the "Default Working/Back-up" item of the setting (2) in Table 1 is absent and that a "Redundant Node Start-up Pass-through Period" item of a setting (7) is added. In this embodiment, whether a node apparatus is the working node apparatus or the back-up node apparatus is not externally set such as by the NMS, but the node apparatus autonomously determines it and operates.

TABLE 3

| | Setting Item | Settings for Node A | Settings for Node F | Settings for Nodes B to E | Note |
|---|---|---|---|---|---|
| Setting (1) | Redundancy Function Enable/Disable | Enable | Enable | Disable | Setting Unique to the Embodiment |

TABLE 3-continued

| | Setting Item | Settings for Node A | Settings for Node F | Settings for Nodes B to E | Note |
|---|---|---|---|---|---|
| Setting (3) | TP Frame Reception Stop Determination Period (Node Switching Protection Period) | 15 ms | 15 ms | No Setting Required | Setting Unique to the Embodiment |
| Setting (4) | Station ID (MAC Address) | a | a | b to e Respectively | |
| Setting (5) | TP Frame Transmission/Reception Cycle | 5 ms | 5 ms | 5 ms | |
| Setting (6) | TP Frame Reception Stop Determination Period (RPR Switching Protection Period) | 30 ms | 30 ms | 30 ms | |
| Setting (7) | Redundant Node Start-up Pass-through Period | 30 s | 60 s | No Setting Required | Setting Unique to the Embodiment |

Figure 9:
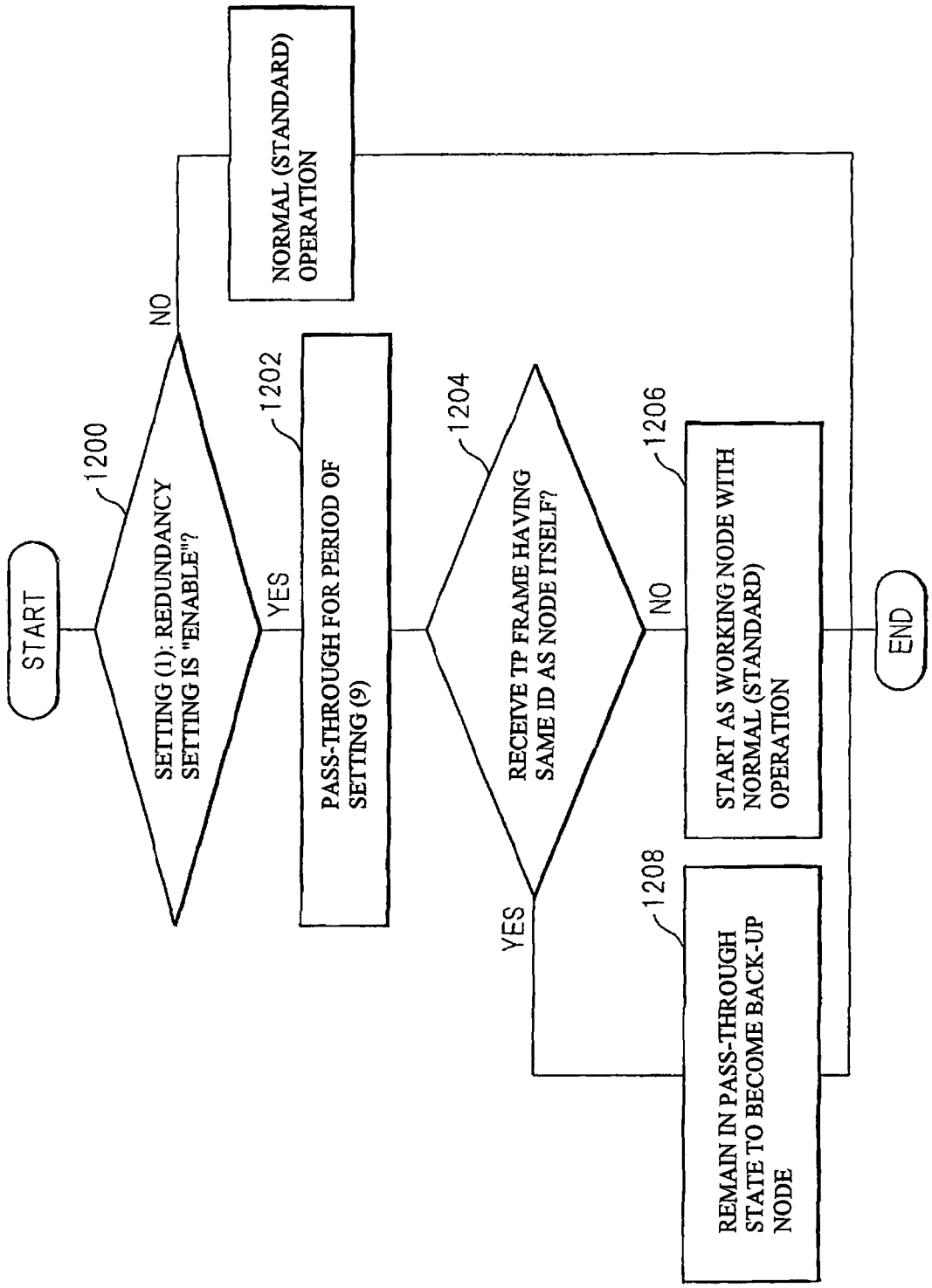
FIG. 9 is a flowchart of a second example of initial operations.

FIG. 9 shows a flowchart of the initial operation. In the topology database construction, each of the redundantly configured nodes A and F operates by determining whether it is the working node or the back-up node in the following manner.

i) The nodes A and F start in the pass-through state (step 1202). In this state, the nodes A and F are monitoring for the TP frame having the Source MAC address=a (step 1204). (Since neither the node A nor the node F has transmitted the TP frame, the TP frame having the Source MAC address=a does not exist yet.)

ii) The node A has not received the TP frame after a lapse of 30 seconds (the period of the setting (7)) from the start of the pass-through state, so that the node A operates as the working node (step 1206). The node A starts broadcasting of the TP frame having the Source MAC address=a. The node F receives the TP frame from the node A and therefore continues operating as the back-up node (step 1208). That is, the node F remains in the pass-through state and monitors received control frames to keep track of the state of the working node. If the node F broadcasts the TP frame having the Source MAC address=a before the node A does, the node F operates as the working node and the node A operates as the back-up node.

Switching operations on the occurrence of a failure are the same as in the above-described embodiment.

General operations upon recovery from a failure state will be chronologically described.

i) The node A recovers from a failure state and starts in the pass-through state.

ii) The node A receives the TP frame having the same Source MAC address as itself transmitted from the node F. As a result, the node A remains in the pass-through state and monitors received control frames to keep track of the state of the back-up node operating as the working node.

iii) If it is desired that the node A be switched back to the working node after the recovery from the failure, the switching is performed by using a command from the NMS to make a setting for stopping the TP frame from the node F.

The above description is a mode (non-switchback mode) in which the back-up node may continue operating as the working node even after the working node properly recovers on the ring. This mode enables quick node redundancy switching with minimum required switching operations.

Figure 10:
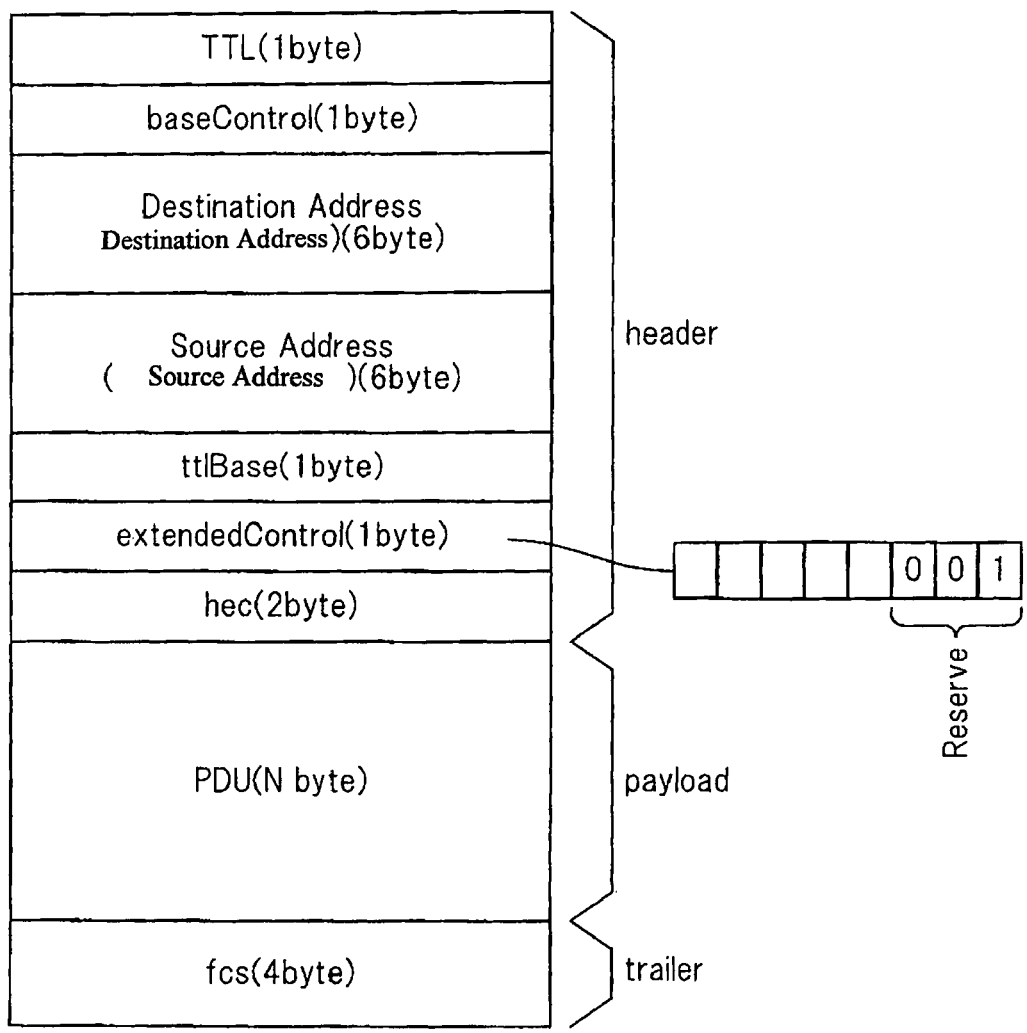
FIG. 10 shows the format of a learning request packet exchanged between redundantly configured nodes.

Exemplary processing for synchronizing the MAC learning table in the back-up node with the MAC learning table in the working node will be described. A learning request packet is used to synchronize the MAC learning table in the back-up node with the MAC learning table in the working node. As an example, a method is employed in which reserved bits (three bits, 000 by default) of Extended Control in the RPR header are set to 001 for identification as the learning request packet. FIG. 10 shows the format of the learning request packet in this case. Each time the working node performs the MAC learning, the working node sets the reserved bits of the Extended Control in the RPR frame used as the source of the MAC learning to 001, and outputs the RPR frame to the ring. The back-up node receives this data and identifies it as the learning request packet by the reserved bits of the Extended Control. The back-up node learns necessary information such as the SA, DA, and VLAN ID of the received RPR frame and stores them in its own MAC learning table.

Figure 11:
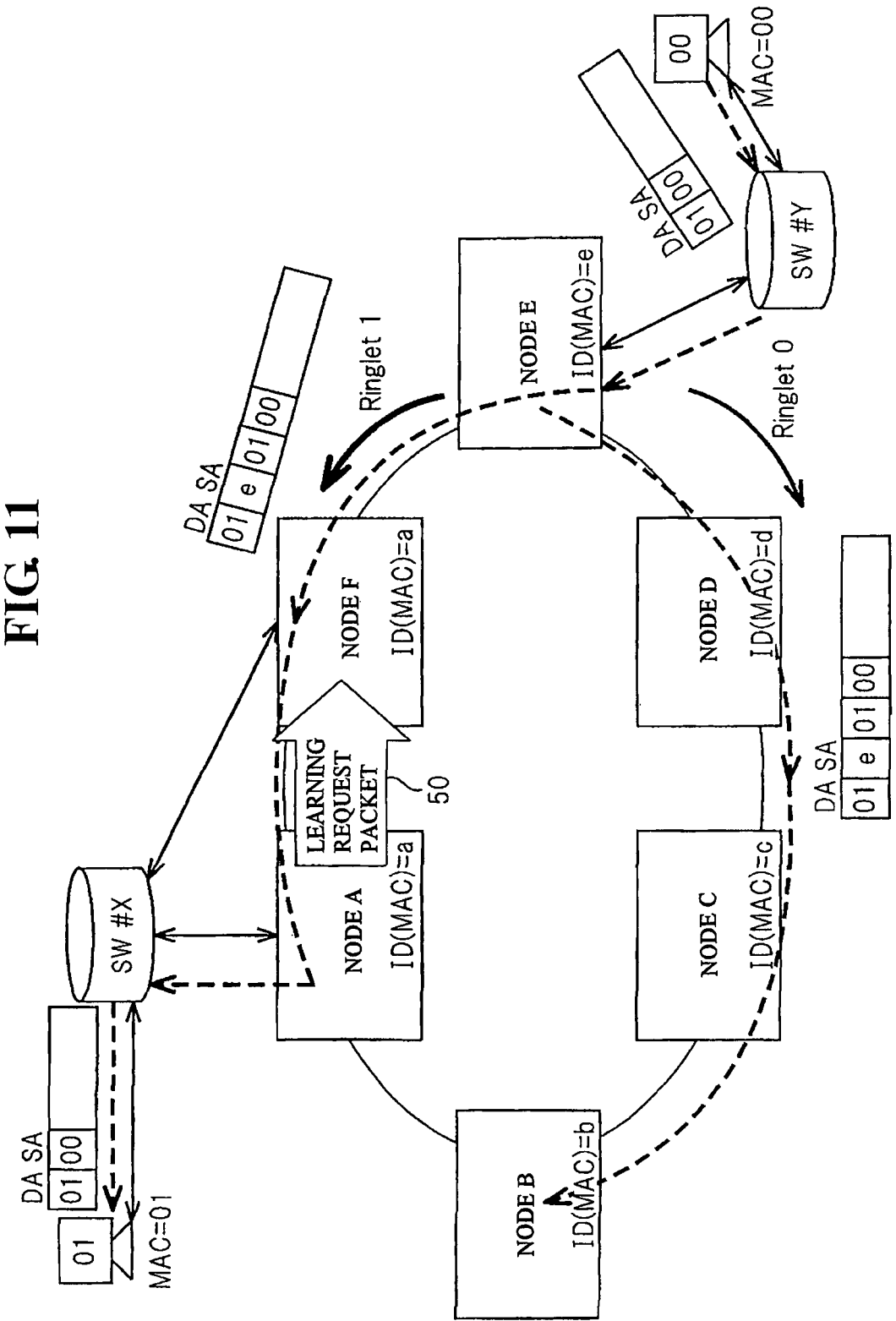
FIG. 11 is a diagram illustrating operations for synchronizing MAC learning tables.

General operations for synchronizing the MAC learning tables will be described with reference to FIGS. 11 and 12. First, consider a communication from a terminal 00 to a terminal 01 (destination address DA: 01, source address SA: 00) in FIG. 11. No nodes have performed the MAC learning in the initial state. Therefore, each node learns that the terminal of the source address SA=00 exists under the node E based on flooding from the node E as indicated by dashed arrows. The working node A transmits its newly learned information in a learning request packet 50 to the back-up node. The back-up node performs the MAC learning with the learning request packet, which is then discarded.

Figure 12:
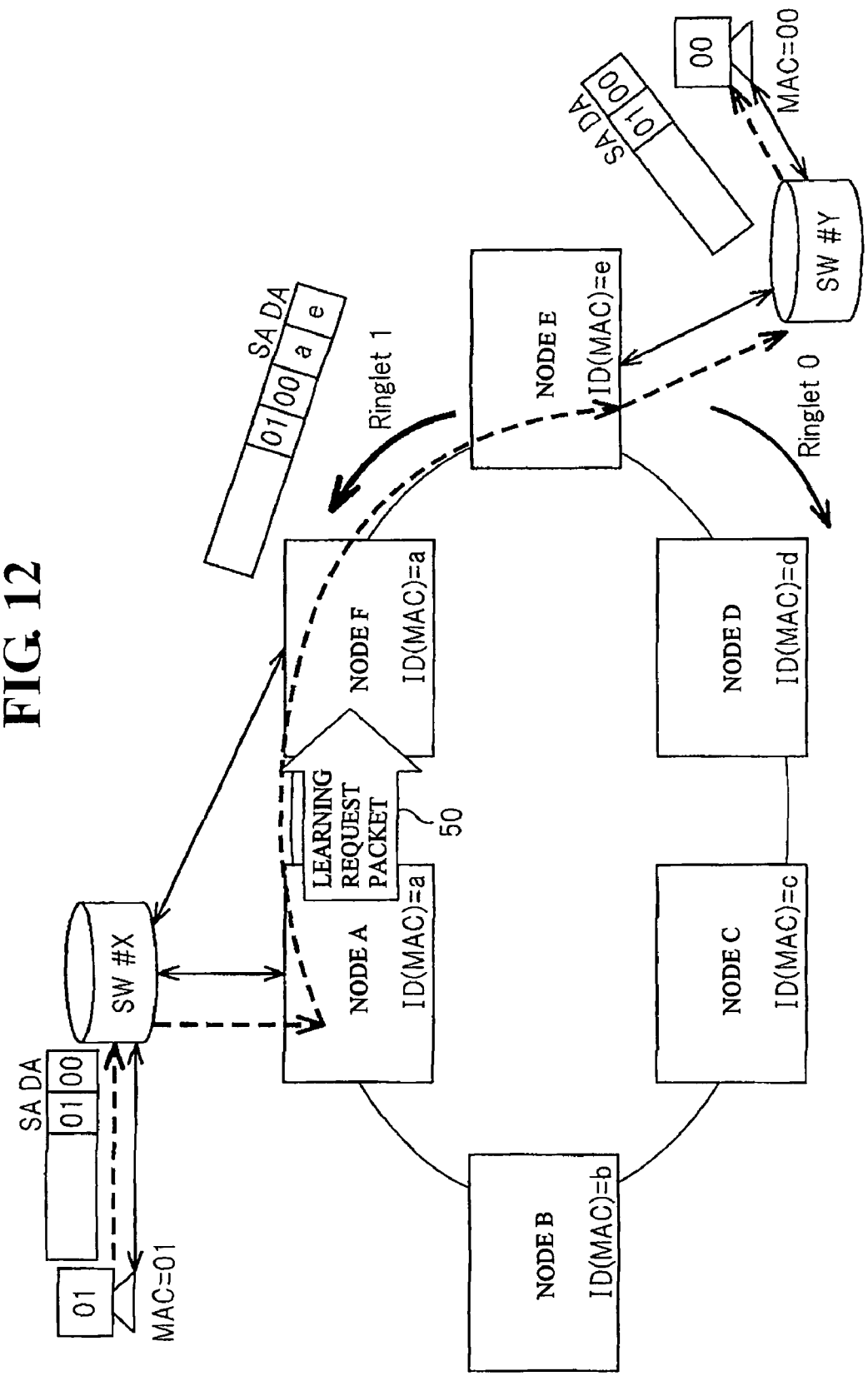
FIG. 12 is a diagram illustrating operations for synchronizing the MAC learning tables.

Next, as shown in FIG. 12, consider a communication from the terminal 01 to the terminal 00 (destination address DA: 00, source address SA: 01). Since the node A has learned that the MAC: 00 exists under the node E, the node A determines the shortest route to transmit only in the Ringlet 0 direction through the nodes A→F→E to the terminal 00 as shown by dashed arrows. Here, the nodes A and E perform the MAC learning for the MAC: 01. As in the above case, the information learned by the node A is also learned by the node F with the learning request packet 50, which is then discarded.

Thus, the MAC learning in the working node and the back-up node is synchronized. This MAC learning synchronization method can be implemented wherever the redundancy configuration exists in the ring (even if the working apparatus and the back-up apparatus are not adjacent to each other) or even if one node has two or more RPR stations, each being redundantly configured.

Figure 13:
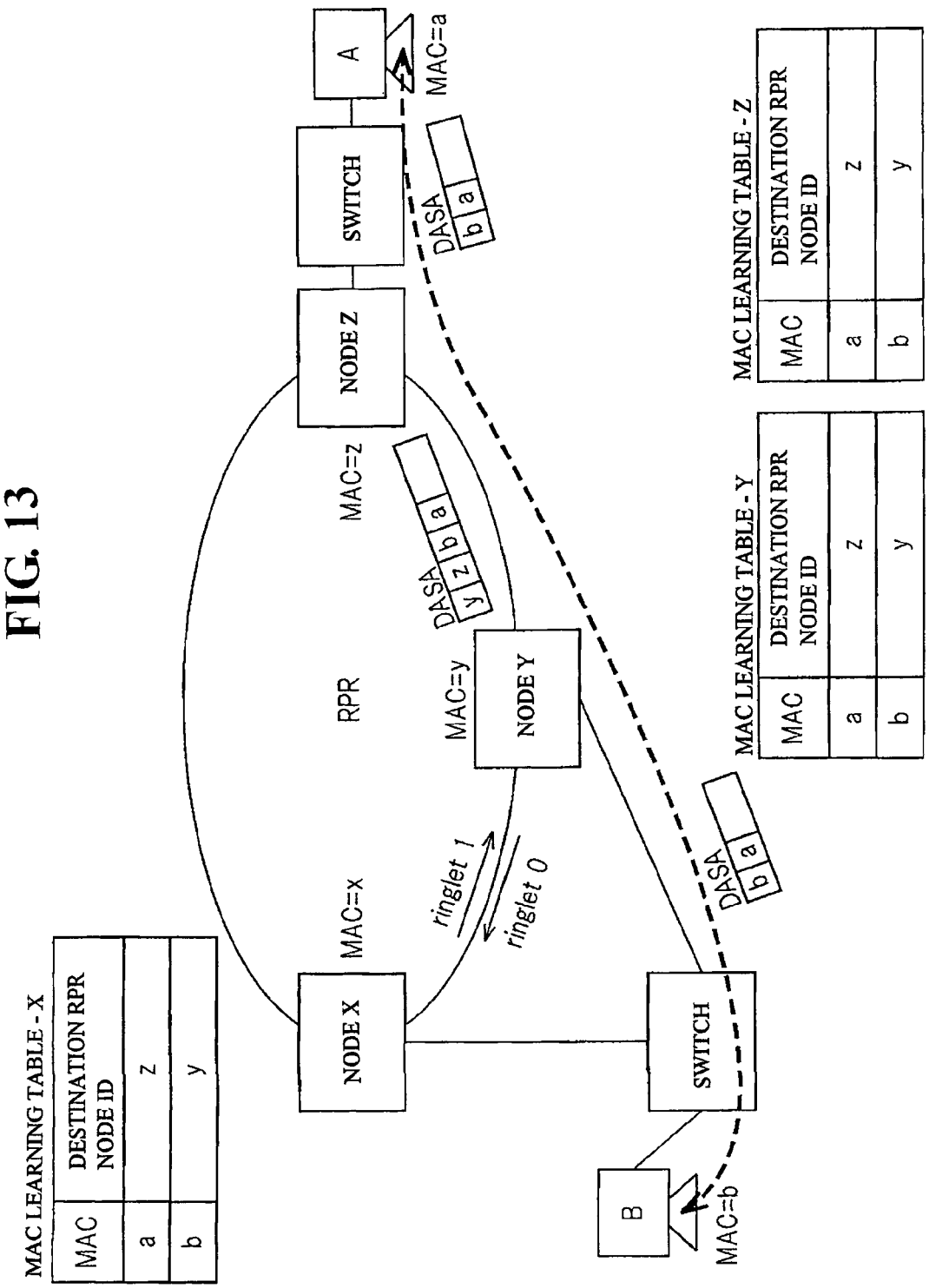
FIG. 13 shows redundancy configuration using only a standard protocol.

Finally, with reference to FIG. 13, description will be given of operations in the case where the working and back-up switching is performed using only a standard protocol by assigning different MAC addresses to the working apparatus and the back-up apparatus. In the technique shown in FIG. 13, dual lines are provided under a node X and a node Y so that, on the occurrence of a failure in one node, communications performed with the node are protected by the other node. A terminal A and a terminal B have established communication with the MAC learning shown in FIG. 13. If a failure occurs in the node Y, the standard operation would involve the following process, which takes time and effort to protect the communication.

(i) The RPR ring redundancy switching (steering method or wrapping method) occurs (within 50 ms).

(ii) Frames destined for the node Y continue to be transmitted to the node Y (for several minutes) until the MAC address of the node Y learned by each node is deleted from the MAC learning table (aging timeout).

(iii) After deletion from the MAC learning table, a frame is flooded from a node Z for establishing frame transmission from the MAC=a to the MAC=b.

(iv) The flooding causes the node X to perform the MAC learning, thereby establishing communication between the MAC=a and the MAC=b.

Thus, according to the operations using only the standard protocol, it would take 50 ms plus several minutes to establish the communication between the MAC=a and the MAC=b after the occurrence of a node failure, and the extra flooding also occurs. In contrast, according to the present technique described above, the communication between the MAC=a and the MAC=b can be established in the period for the RPR ring redundancy switching (several 10 ms) after the occurrence of a node failure, and the extra flooding can be eliminated.

What is claimed is:

1. A node system for a network formed by a plurality of nodes communicatively coupled as a ring, comprising:
   a working node that selectively drops a frame destined for a terminal hosted by the working node among frames transmitted on the ring and adds a frame from the terminal hosted by the working node to frames transmitted on the ring;
   a back-up node that lets a frame destined for a terminal hosted by the back-up node pass through to the working node and discards a frame from the terminal hosted by the back-up node; and
   a function selection unit selectively enabling one of the working node and the back-up node based on a failure of the working node, wherein
   in use in the network, both the working node and the back-up node are incorporated in the ring to constitute part of the ring, and the terminal hosted by the working node is also hosted by the backup node, and
   the working node and the back-up node are assigned the same identifier as an identifier by which each node apparatus included in the ring identifies another.

2. The node system according to claim 1, further comprising:
   a frame monitoring unit monitoring a control frame from the working node when the back-up node is enabled; and
   a switching unit autonomously switching to the working node when the control frame from the working node is not received for a predetermined period.

3. The node system according to claim 2, further comprising means for stopping transmission of the control frame upon detection of a failure in a line associated with the working node.

4. The node system according to claim 2, wherein the network is an RPR (Resilient Packet Ring) network and the predetermined period is set shorter than a switching protection period for the RPR network.

5. The node system according to claim 4, further comprising a communication unit communicating learned information from the working node to the back-up node when the working node learns which node is the host of a terminal hosted by a node included in the ring.

6. The node system according to claim 1, further comprising a switching unit starting as the back-up node upon start-up, and for autonomously switching to the working node when a control frame from the working node is not received for a predetermined period.

7. A method of protecting communications in a node system for a network formed by a plurality of nodes communicatively coupled as a ring, comprising:
   performing functions in a working node that selectively drops a frame destined for a terminal hosted by the working node among frames transmitted on the ring and adds a frame from the terminal hosted by the working node to frames transmitted on the ring;
   performing functions in a back-up node that lets a frame destined for a terminal hosted by the back-up node pass through to the working node and discards a frame from the terminal hosted by the back-up node; and
   selectively enabling one of the working node and the back-up node based on a failure state of the working node, wherein
   in use in the network, both the working node and the back-up node are incorporated in the ring to constitute part of the ring, and the terminal hosted by the working node is also hosted by the back-up node, and
   the working node and the back-up node are assigned the same identifier as an identifier by which each node apparatus included in the ring identifies another.

8. The method according to claim 7, further comprising:
   monitoring a control frame from the working node when the back-up node is enabled; and
   autonomously switching to the working node when the control frame from the working node is not received for a predetermined period.

9. The method according to claim 8, further comprising stopping transmission of the control frame upon detection of a failure in a line associated with the working node.

10. The method according to claim 8, wherein the network is an RPR (Resilient Packet Ring) network and the predetermined period is set shorter than a switching protection period for the RPR network.

11. The method according to claim 10, further comprising communicating learned information from the working node to the back-up node when the working node learns which node is the host of a terminal hosted by a node included in the ring.

12. The method according to claim 7, further comprising starting as the back-up node upon start-up, and for autonomously switching to the working node when a control frame from the working node is not received for a predetermined period.

* * * * *

UNITED STATES PATENT AND TRADEMARK OFFICE
CERTIFICATE OF CORRECTION

| | |
|---|---|
| PATENT NO. | : 7,885,181 B2 |
| APPLICATION NO. | : 12/003284 |
| DATED | : February 8, 2011 |
| INVENTOR(S) | : Toshihiro Ban et al. |

It is certified that error appears in the above-identified patent and that said Letters Patent is hereby corrected as shown below:

Column 11, Line 62, In Claim 1, delete "failure of" and insert --failure state of--, therefor.

Column 11, Line 67, In Claim 1, delete "backup" and insert --back-up--, therefor.

Signed and Sealed this
Nineteenth Day of July, 2011

David J. Kappos
*Director of the United States Patent and Trademark Office*